United States Patent [19]

Vasconcellos et al.

[11] Patent Number: 5,720,887
[45] Date of Patent: Feb. 24, 1998

[54] METHODS FOR SLUDGE DEWATERING

[75] Inventors: Stephen R. Vasconcellos, Doylestown; Michael R. Wood, Philadelphia, both of Pa.; Kimberly A. Bell, Blackwood, N.J.

[73] Assignee: BetzDearborn Inc., Trevose, Pa.

[21] Appl. No.: 749,368

[22] Filed: Nov. 21, 1996

[51] Int. Cl.⁶ .................................................. C02F 1/54
[52] U.S. Cl. ........................ 210/727; 210/734; 210/736
[58] Field of Search ................................. 210/727, 734, 210/735, 736, 609

[56] References Cited

U.S. PATENT DOCUMENTS

| | | | |
|---|---|---|---|
| 3,023,162 | 2/1962 | Fordyce et al. | 210/54 |
| 3,894,945 | 7/1975 | Panzer et al. | 210/736 |
| 3,915,904 | 10/1975 | Tonkyn et al. | 210/736 |
| 3,962,159 | 6/1976 | Ray-Chaudhuri et al. | 162/175 |
| 4,319,013 | 3/1982 | Cabestany et al. | 526/287 |
| 4,396,513 | 8/1983 | Haldeman | 210/734 |
| 4,396,752 | 8/1983 | Cabestany et al. | 526/287 |
| 4,479,879 | 10/1984 | Hashimoto et al. | 210/727 |
| 4,758,353 | 7/1988 | Spence et al. | 210/727 |
| 4,840,736 | 6/1989 | Sander et al. | 210/727 |
| 4,869,829 | 9/1989 | Casey | 210/727 |
| 5,006,639 | 4/1991 | Tono et al. | 210/727 |
| 5,100,561 | 3/1992 | Wood et al. | 210/734 |
| 5,200,086 | 4/1993 | Shah et al. | 210/727 |
| 5,211,854 | 5/1993 | Liao et al. | 210/734 |

FOREIGN PATENT DOCUMENTS

| | | |
|---|---|---|
| 8183999 | 10/1983 | Japan . |
| 1025699 | 2/1986 | Japan . |
| 3151397 | 6/1988 | Japan . |

*Primary Examiner*—Peter A. Hruskoci
*Assistant Examiner*—Betsey J. Morrison
*Attorney, Agent, or Firm*—Alexander D. Ricci; Philip H. Von Neida

[57] ABSTRACT

The present invention provides a method for dewatering sludge that utilizes the step-wise and sequential addition to the sludge of a cationic polyamine and a cationic polyacrylamide.

9 Claims, No Drawings

METHODS FOR SLUDGE DEWATERING

FIELD OF THE INVENTION

The present invention relates to methods for dewatering sludge. More particularly, the present invention relates to the step-wise addition of a cationic polyamine and a cationic polyacrylamide to sludge to dewater the sludge.

BACKGROUND OF THE INVENTION

Sludge dewatering has become an essential part of wastewater treatment programs due in part to an increasing concern over environmental conditions. No longer can untreated sludge simply be dumped into the nearest river, lagoon or vacant lot. With this environmental interest in mind, improved sludge concentrating and dewatering techniques have become an important task in the water treatment industry.

Generally sludge is given primary dewatering treatment before being discharged from any given process system. Primary dewatering is usually accomplished using thickeners/clarifiers or settling ponds. Secondary dewatering, including vacuum filtration, centrifugation, belt filters, lagoons, etc., is then commonly employed to further increase the solids content and reduce the water content in the resulting sludge to 50 to 90% liquid. This can cause sludge dewatering to be a slow process.

In sludge handling facilities, problems often encountered in the dewatering process include the formation of sludge cake with high moisture content, the formation of sticky sludge, poor cake release from dewatering equipment, high disposal, slow dewatering and poor equipment efficiency.

Improved sludge dewatering can lead to increased savings, especially with respect to the costs associated with transportation of the sludge to be disposed. Water soluble polyelectrolytes, such as anionic and cationic polymers, are often added to the sludge to aid in the production of a drier cake and in the reduction of wear and tear on dewatering equipment. One problem, however, with these anionic and cationic polymers is that their operating parameters are limited. The addition of too much of these types of dewatering agents can cause the solids to disperse and defeat the whole purpose of dewatering.

Additional problems are also encountered in wastewater systems having a high pH (>8) and containing oil. Flocculating fine-solid sludges without generating a stickly floc is difficult and there are limited methods for accomplishing such.

The present inventors have discovered a step-wise method of adding cationic polymers to wastewater to produce a dewatered floc that is not sticky.

DESCRIPTION OF THE RELATED ART

U.S. Pat. No. 5,006,639 teaches methods for coagulating sludge comprising the sequential addition of an anionic polymer coagulant and a cationic polymer coagulant to the sludge followed by the addition of an anionic polymer flocculant. The anionic polymer has a pH of 6 to 8 such as an acrylamide polymer and the cationic polymer coagulant has a pH of 3 to 6 such as a polymeric cationic ester.

U.S. Pat. No. 3,023,162 discloses a homopolymer of dimethylaminoethyl methacrylate quaternized with ethylene or propylene oxide for dewatering. U.S. Pat. Nos. 4,319,013 and 4,396,752 teach that a cationic copolymer of acrylamide and quaternized dimethylaminoethyl acrylate can be used for dewatering.

U.S. Pat. No. 4,396,513 discloses the use of a cationic copolymer consisting essential of 10 to 20% acrylamide and 90 to 80% dimethylaminoethyl methacrylate methyl chloride for biological sludge dewatering.

U.S. Pat. No. 5,100,561 teaches the use of cationic homopolymers comprising the polymerization products of ethylenically unsaturated cationic monomers for sludge dewatering. Preferably the cationic monomer is methacryloyloxyethyl trimethyl ammonium chloride.

DETAILED DESCRIPTION OF THE INVENTION

The present invention relates to methods for dewatering sludge comprising the step-wise addition to the sludge of an effective dewatering amount of (a) a cationic polyamine polymer and (b) a cationic polyacrylamide.

The cationic polyamine polymer is preferably the reaction product of bis-hexamethylenetriamine and dichloroethane having the formula:

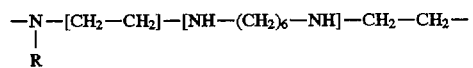

wherein R is H, $CH_3$, $C_2H_5$, $C_3H_7$, $C_4H_9$, $C_5H_{11}$ or $C_6H_{13}$.

This polymer has a molecular weight from about 1000 to about 250,000 with a molecular weight of about 50,000 preferred. The preferred intrinsic viscosity is 0.26 and the charge density at pH 4 is 6.7 and at pH 7 is 5.1. This polymer is commercially available as BetzDearborn 1185 from BetzDearborn Inc., Trevose, Pa.

The cationic polyacrylamides generally have the structure:

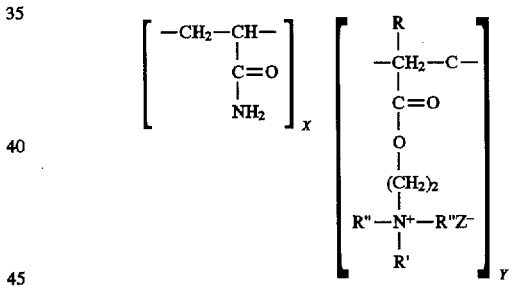

wherein X is acrylamide, Y is a cationic monomer selected from the group consisting of 2-acryloyloxyethyltrimethyl ammonium chloride (AETAC), 2-methacryloyloxyethyltrimethyl ammonium chloride (METAC), 3-acrylamidopropyltrimethyl ammonium chloride (APTAC), and 3- methacrylamidopropyltrimethyl ammonium chloride (MAPTAC).

The molar ratio of acrylamide (X) to cationic monomer (Y) is in the range of 0:100 to 95:5 with the proviso that the sum of the molar ratios of X and Y add up to 100. R is H or $CH_3$; R' is $CH_3$ or $C_2H_5$; R" is $CH_3$ or $C_2H_5$; and Z is chloride, bromide or methosulfate.

The cationic polyacrylamides can be block copolymers prepared by a water-in-oil emulsion technique. Methods for preparing these block copolymers are described in U.S. Pat. No. 5,368,744, the contents of which are herein incorporated by reference.

The mole percent cationicity of the block copolymer can range from 10 to 70 percent with a range of 20 to 50 percent preferred. The molecular weight of the block copolymer is not critical as long as it remains soluble in water.

3

In the methods of the present invention, the step-wise addition of first the cationic polyamine and then the cationic polyacrylamide block copolymer results in a sludge (floc) with good drainage and little to no stickiness or tackiness. This method is particularly preferred for wastewater systems that are high pH (greater than 8) and that contain oil.

For purposes of the present invention, the term an effective dewatering amount is that amount which is sufficient to dewater sludge and will vary according to the condition of the sludge such as pH, oil content and amount of solids in the sludge.

Preferably, the cationic polyamine is added to the sludge in an amount ranging from about 50 parts to about 2000 parts per million parts sludge with a range of about 200 parts to about 1200 parts per million more preferred.

The time interval between adding the first, cationic polyamine, and the second, cationic polyacrylamide can be as short as 0.5 to 2 minutes and longer as necessary. This interval is not crucial as long as the polymers are added in a step-wise fashion.

The cationic polyacrylamide is added to the wastewater in an amount ranging from about 10 parts to about 500 parts per million parts of sludge with an amount of about 50 parts to about 200 parts per million preferred.

The step-wise addition of the respective polymers may be performed after the sludge has been clarified with a traditional clarifying aid. The step-wise addition may also be performed after the sludge has been subjected to a thickener or digester or the like. The step-wise addition may also be performed prior to other dewatering processes such as belt filters, vacuum filters, centrifuges, lagoons, or waste water treatment systems.

EXAMPLES

The invention will now be further described with reference to a number of specific examples which are to be regarded solely as illustrative and not as limiting the scope of the invention.

A modified Buchner Funnel (MBF) test was first performed to determine the relative effectiveness of polymer treatments in sludge dewatering. This test determines the dewaterability of a sludge substrate by measuring the free water release rate (ml/sec) via filtering over a period of time.

To perform this test, a Whatman #4 filter is first placed in the Buchner Funnel and is wetted to ensure a proper seal. The funnel and filter are placed atop a 500 ml graduated buret. A vacuum source is operatively connected to the buret and is set to the desired negative pressure. 200 ml of sludge are placed into a 400 ml breaker. The desired amount of the polymeric treatment is then added, and the sludge-polymer mixture is mixed via utilization of a three-bladed propeller stirrer. The vacuum is then actuated and the sludge-polymer sample is poured into the Buchner Funnel. At this moment, an observer starts a stopwatch and records the time needed to produce a predetermined amount of filtrate. The designation "1185/A", for example, represents the step-wise addition of two polymers. The results of this testing are reported in Table I.

4

TABLE I

Modified Buchner Funnel Test
20% SiO₂ substrate

| Polymer | Dosage (ppm) | Rate (ml/sec) | Cake Description | Filtrate Description |
|---|---|---|---|---|
| A | 300 | 3 | Wet and Tacky | Dirty |
| 1185/A | 1000/100 | 3.2 | Dry Definite Form | Clean |
| B | 200 | 0.25 | Tacky | Clean |
| 1185/B | 1000/160 | 3.0 | Dry Definite Form | Clean |
| C | | | No Dewatering Capability Displayed | |
| 1185/C | 1000/80 | 2.8 | Some Form | Clean |
| 1185 | | | No Dewatering Capability Displayed | |

Polymer A is NOVUS® 2676, 20% cationic polyacrylamide, available from BetzDearborn Inc., Trevose, Pa.

Polymer B is NOVUS® 2680, 40% cationic polyacrylamide, available from BetzDearborn, Inc., Trevose, Pa.

Polymer C is NOVUS® 2666, 50% cationic polyacrylamide, available from BetzDearborn Inc., Trevose, Pa.

1185 is BetzDearborn Polymer 1185, available from BetzDearborn, Inc., Trevose, Pa.

This testing indicated that the two-component step-wise polymer treatment significantly reduced sludge cake tackiness.

A Larox laboratory scale belt filter press was the second method employed to evaluate polymer dewatering performance. The design of this instrument permits modeling of full-scale belt filter press operations by adjustment of conditions such as solids loading, filter media, free drainage time, pressure and press time. The sludge cake produced from the laboratory scale belt filter press is analyzed for percent solids and percent solids capture, with solids capture being defined as the quantity of solids retained by the belt filter media compared to the quantity of solids loaded on the press. Higher values of percent sludge cake solids and percent solids capture indicates a higher degree of dewatering and better treatment performance.

The results of this testing are presented in Table II. Dosages were the same as determined above.

TABLE II

Larox Filter Press

| Polymer | Results |
|---|---|
| 1185 | Could not be loaded - not enough floc formed |
| 1185/A | Produced 67.5% cake solids |
| 1185 1B | Produced 67.0% cake solids |
| 1185/C | Could not be loaded - not enough floc formed |
| A | Could not be loaded - no floc formation |
| B | Could not be loaded - no floc formation |
| C | Could not be loaded - no floc formation |

As demonstrated in Table II, the sludge that was dewatered by the methods of the present invention produced less water and a drier cake.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for dewatering sludge having a pH greater than 8 and containing oil comprising the step-wise addition to the sludge of an effective dewatering amount of (a) a cationic polyamine polymer having the structure

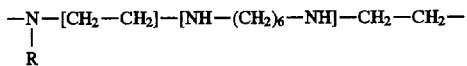

where R is H, CH$_3$, C$_2$H$_5$, C$_3$H$_7$, C$_4$H$_9$, C$_5$H$_{11}$ or C$_6$H$_{13}$ and (b) a cationic polyacrylamide having the structure

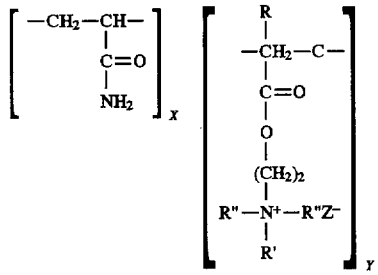

wherein X is acrylamide and Y is a cationic monomer; R is H or CH$_3$; R' is CH$_3$ or C$_2$H$_5$; R" is CH$_3$ or C$_2$H$_5$; Z is chloride, bromide or methosulfate;

wherein the mole percent cationicity of said cationic polyacrylamide is from 20 to 50 percent, and dewatering said sludge.

2. The method as claimed in claim 1 wherein said cationic polyamine has a molecular weight of about 1000 to about 250,000.

3. The method as claimed in claim 2 wherein said cationic polyamine has a molecular weight of about 50,000.

4. The method as claimed in claim 1 wherein said cationic polyamine is the reaction product of bis-hexamethylenetriamine and dichloroethane.

5. The method as claimed in claim 1 wherein said cationic monomer is selected from the group consisting of 2-acryloyloxy-ethyltrimethyl ammonium chloride, 2-methacryloyloxyethyltrimethyl ammonium chloride, 3-acrylamidopropyltrimethyl ammonium chloride, and 3-methacrylamidopropyltrimethyl ammonium chloride.

6. The method as claimed in claim 1 wherein said effective dewatering amount of said cationic polyamine is from about 50 parts to about 2000 parts per million parts sludge.

7. The method as claimed in claim 1 wherein said effective dewatering amount of said cationic polyacrylamide is from about 50 parts to about 200 parts per million parts sludge.

8. The method as claimed in claim 1 wherein said step-wise addition comprises an interval of at least 1 minute between the addition of the cationic polyamine and the cationic polyacrylamide.

9. The method as claimed in claim 1 wherein said sludge is dewatered in a system selected from the group consisting of belt filter, vacuum filter, centrifuge, lagoon and waste water treatment.

* * * * *